May 26, 1964            A. J. SARKA            3,134,283

APPARATUS FOR SHEARING CONTINUOUSLY ADVANCING STRIP

Original Filed May 2, 1958            3 Sheets-Sheet 1

INVENTOR
Albert J. Sarka

INVENTOR
Albert J. Sarka

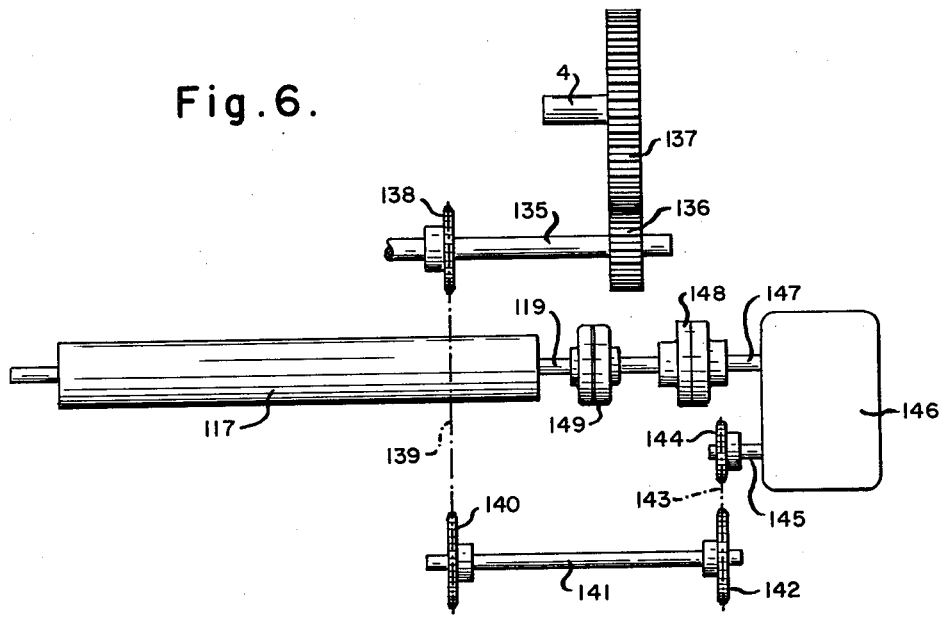

United States Patent Office 3,134,283
Patented May 26, 1964

3,134,283
APPARATUS FOR SHEARING CONTINUOUSLY ADVANCING STRIP
Albert J. Sarka, Maple Heights, Ohio, assignor to The Wean Engineering Company, Inc., Warren, Ohio, a corporation of Ohio
Continuation of application Ser. No. 732,504, May 2, 1958. This application Sept. 5, 1961, Ser. No. 136,095
1 Claim. (Cl. 83—395)

This invention relates to apparatus for shearing continuously advancing strip and is in the nature of an improvement over the apparatus disclosed in my copending application Serial No. 617,180, filed October 19, 1956, now Patent No. 3,037,410, patented June 5, 1962. The present application is a continuation of my copending application Serial No. 732,504, filed May 2, 1958, now abandoned.

My first mentioned copending application discloses apparatus for shearing continuously advancing strip including a cyclically operable shear which advances while it shears, the shear including continuously cyclically operable upper and lower shearing elements, opposed front stops adapted to be engaged by the leading end of the strip at portions of such leading end adjacent the respective side edges of the strip connected with the upper shearing element and movable relatively thereto and out of position in the pass line together with means for clamping the strip between the upper and lower shearing elements with the leading end of the strip registered to the front stops and while the strip is being severed by coaction of the upper and lower shearing elements. While such apparatus proved quite satisfactory in use I have devised apparatus having important advantages thereover.

While the apparatus of my first mentioned copending application produced parallel cuts in severing the strip such cuts were not always at right angles to the length of the strip within the allowable tolerance because of camber conditions in certain types of material. I am able to insure cuts at right angles to the length of the strip within the allowable tolerance by certain changes in the apparatus which I have made including the provision of a single front stop substantially at the center line of the shear.

I also find it highly advantageous to mount the front stop means (whether a single stop substantially at the center line of the shear or opposed stops adjacent the side edges of the strip as disclosed in my said copending application) on the lower shearing element rather than connected with the upper shearing element as then the front stop means are normally positioned to be engaged by the leading end of the strip as the strip advances, being acted upon by gravity to urge it downwardly. When the front stop means are carried by the upper shearing element perfect timing is required to insure positioning of the front stop means in the pass line at exactly the right instant to intercept the rapidly advancing strip; the difficulty of attaining such perfect timing increases with increase in speed. The mechanism herein disclosed is more readily adaptable to high speed operation. This is important since strip speeds are continually increasing and the elements of the apparatus must move with the utmost precision and accuracy of timing.

In its primary elements the apparatus of the present application is generally like that of my first mentioned copending application. Means are provided for advancing the strip to the shear and desirably provision is made for rendering inoperative the means for advancing the strip while the strip is being severed so that at the instant of severing the strip its movement is controlled by the shearing elements and not by the feeding means. The shear itself is of the type disclosed in my Patent No. 2,827,962 and now well known to those skilled in the art. Since most of the structure of my present apparatus is disclosed in my said patent and first mentioned copending application I have presented in the present application simplified drawings directed primarily to the features of the present invention and omitting some elements which those skilled in the art would understand to be included. I have shown one form of means for feeding the strip to the shear with means for rendering the feeding means inoperative at the instant of shearing, such means being of the form disclosed in my first mentioned copending application. The feeding means and the means for rendering inoperative the feeding means at the instant of shearing or severing the strip may take various forms. It is not in all cases absolutely essential to provide means for rendering inoperative the feeding means at the instant of severing the strip as provision may be made for humping the strip intermediate the feeding means and the shearing means so that the strip may be controlled by the shearing means at the instant of shearing without disturbing the continuity of action of the feeding means.

I provide apparatus for shearing strip advancing generally horizontally in a pass line comprising upper and lower shearing elements between which the strip advances, the upper and lower shearing elements respectively carrying coacting upper and lower shear blades, means for moving the shearing elements in the direction of advance of the strip at about the speed of advance of the strip at the instant of shearing, relatively generally toward each other immediately before the instant of shearing and relatively generally away from each other immediately after the instant of shearing, and a front stop mounted on the upper portion of the lower shearing element beyond the lower shear blade in the direction of advance of the strip against which the leading end of the strip is positioned at the instant of shearing to insure shearing the strip into sheets of uniform predetermined length, the front stop due to the movement of the lower shearing element projecting above the pass line immediately before the instant of shearing to position the leading end of the strip and retracting below the pass line immediately after the instant of shearing.

I preferably also provide means supporting the sheared sheets as they continue their advance after the instant of shearing, the front stop due to the movement of the lower shearing element projecting above the supporting means immediately before the instant of shearing to position the leading end of the strip and retracting below the supporting means immediately after the instant of shearing. The supporting means may be and preferably is a conveyor conveying the sheared sheets in the direction of advance after the instant of shearing.

The front stop is preferably positioned substantially at the center of the pass line or, otherwise stated, substantially in the vertical plane containing the center line of the advancing strip. I also preferably provide clamping means clamping the strip to the lower shearing element during the instant of shearing.

I desirably combine the features of mounting the front stop on the lower shearing element and positioning the front stop substantially at the center line of the shear for optimum results although under certain circumstances the individual features may be separately used to good advantage.

Other details, objects and advantages of the invention will become apparent as the following description of a present preferred embodiment thereof proceeds.

In the accompanying drawings I have shown a present preferred embodiment of the invention in which FIGURE 1 is a side elevational view, somewhat diagrammatic and partly in vertical cross section, of apparatus for shearing continuously advancing strip;

FIGURE 5 is a fragmentary top plan view of the structure shown in FIGURES 3 and 4 and FIGURE 6 is a diagram showing the drive connections between the shearing means and the feed means for feeding the strip to the shearing means.

Figure 1:
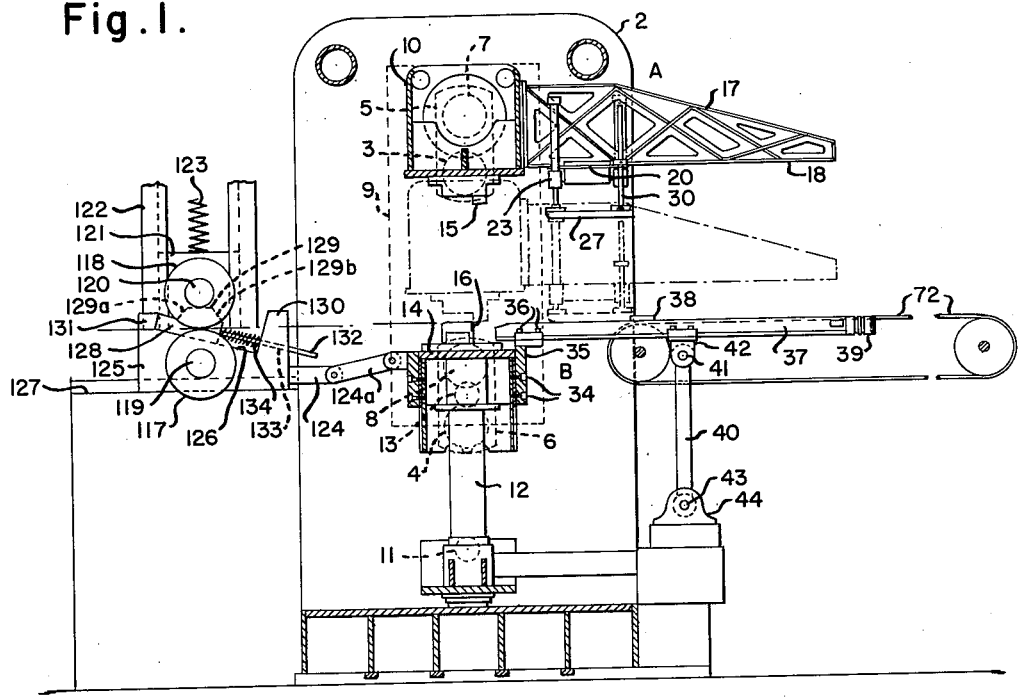
Figure 3:
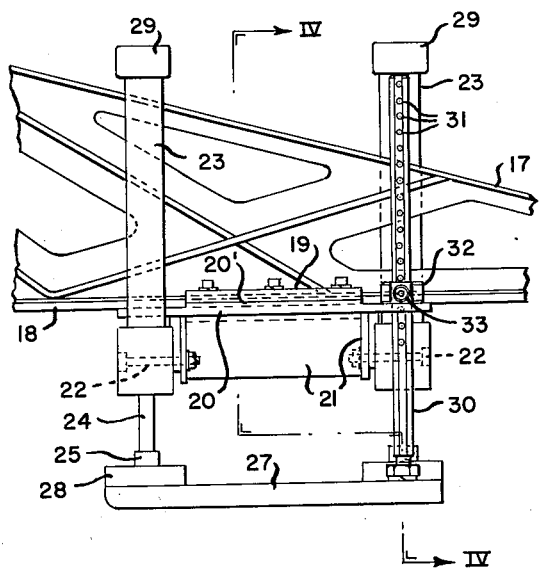
FIGURE 3 is a fragmentary side elevational view to enlarged scale of a portion of the structure shown in FIGURE 1.
Figure 2:
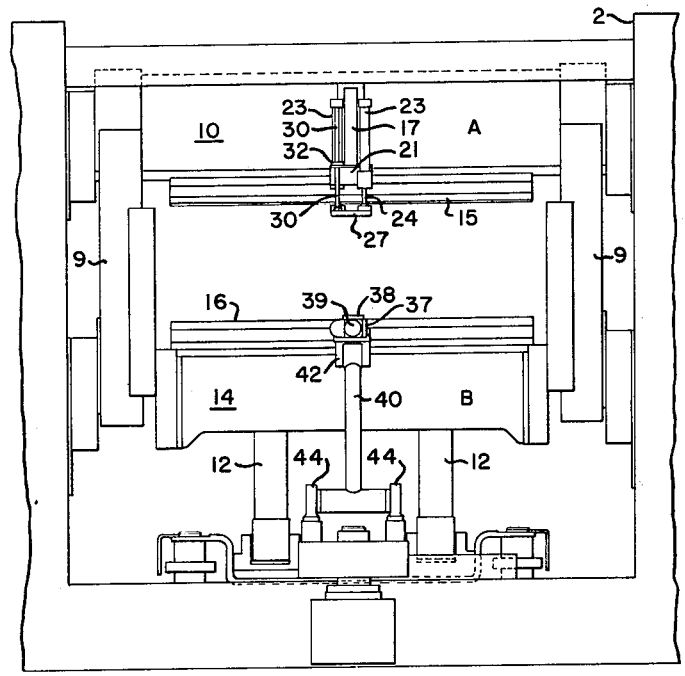
FIGURE 2 is a front elevational view of the apparatus shown in FIGURE 1 as viewed from the right hand side of FIGURE 1 but omitting the strip feeding means and the conveyor for conveying away the sheared sheets in order to more clearly show other elements of the apparatus.

Referring now more particularly to the drawings, the shear housing is designated generally by reference numeral 2. The shear which is shown in the drawings is of the type disclosed in my said patent although my invention may be applied to flying shears of other types. I have not shown all the details of the shear operating mechanism because such details are not necessary to an understanding of the present invention which has to do primarily with the front stop and clamping means. Upper and lower shafts indicated respectively at 3 and 4 rotate in the same direction (counterclockwise viewing FIGURE 1) at the same speed and respectively carry parallel cranks 5 and 6 of equal length. Crank 5 has a crank pin 7 and crank 6 has a crank pin 8. Carried by the crank pins 7 and 8 for rotary movement in the counterclockwise direction viewing FIGURE 1 is a frame 9 which carries the upper head 10 of the shear.

Journaled in the housing 2 at 11 are a pair of parallel arms 12 pivotally connected at 13 to the lower head 14. The lower head 14 is guided for up and down movement in the frame 9. Thus as the frame 9 carrying the upper head 10 partakes of its rotary or cyclic movement the lower head 14 oscillates back and forth about the axis 11. The upper shear blade 15 is carried by the upper head 10 and the lower shear blade 16 is carried by the lower head 14. I shall use the term "upper shearing element" to include the upper head 10, the upper shear blade 15 and the mechanism carried by and movable with the upper head which will presently be described. I shall use the term "lower shearing element" to include the lower head 14, the lower shear blade 16 and the mechanism carried by and movable with the lower head which will presently be described. The characteristic relative movements of the upper and lower shearing elements are explained in my said patent and first mentioned copending application and in any event are now well known to those skilled in the art. The upper and lower shearing elements move toward the right viewing FIGURE 1 as they approach each other and the upper and lower shear blades 15 and 16 shear or sever the strip when they are closest together as illustrated by the showing of FIGURE 1 having the upper shearing element shown in chain lines. At the instant of shearing the strip is controlled by the shearing elements. As the shearing elements continue to move toward the right immediately following the instant of shearing they are retracted away from each other and the sheared off portion of the strip is released and may be carried forward, preferably at somewhat increased speed, by a conveyor 72 shown diagrammatically in FIGURE 1 and to be referred to further below.

Before describing the front stop and clamping means and the operating means therefor I shall describe means for feeding the strip to the shear. The strip is fed toward the right viewing FIGURE 1, by driven feed rolls 117 and 118. The lower feed roll 117 is carried by trunnions 119 having a stationary axis. The upper feed roll 118 is carried by trunnions 120 mounted in bearing blocks 121 vertically movable in guide means 122 and urged downwardly by compression coil springs 123. The feed rolls 117 and 118 are preferably both driven; they may be geared to each other by gears designed to permit slight separation of the rolls without interfering with the drive as well known to those killed in the art. The rolls are driven in a direction to advance the strip toward the right viewing FIGURE 1 and they are effective for thus advancing or feeding the strip when the upper roll 118 is pressed downwardly against the strip resting on the lower roll 117 by the springs 123. When the upper roll 118 is slightly raised upwardly against the action of the springs 123 the positive feeding of the strip by the rolls 117 and 118 is interrupted. The drive for the feed rolls is designed so that the feed rolls advance the strip at a speed approximately equal to the horizontal component of the speed of the shear blades 15 and 16 at the instant of shearing.

A shaft 135 (which may be the driving shaft for the apparatus or a driven shaft) has fixed thereto a spur pinion 136 meshing with a spur gear 137 fixed to the lower shaft 4. Fixed to the driving shaft 135 is a sprocket 138 which through a sprocket chain 139 drives a sprocket 140 fixed to a shaft 141 to which is also fixed a sprocket 142 which through a sprocket chain 143 drives a sprocket 144 fixed to the input shaft 145 of a positive infinitely variable drive unit (generally called a "P.I.V.") 146. The output shaft 147 of the P.I.V. 146 is connected through a coupling 148 and an overrunning clutch 149 with the shaft or trunnion 119 of the lower feed roll 117. By appropriate adjustment of the P.I.V. 146 the feed rolls 117 and 118 are driven so as to advance the strip at a speed approximately equal to the horizontal component of the shear blades 15 and 16 at the instant of shearing.

Connected with the lower head 14 through rods 124 are blocks 125 each having a generally planar upper surface 126 which is inclined downwardly from left to right as shown in FIGURE 1. The blocks 125 are adapted to slide back and forth in guide supports 127. Slidably mounted on the inclined surface 126 of each of the blocks 125 is a slide 128 having an upper face comprising a generally horizontal central portion 129 and inclined end portions 129a and 129b. The respective slides 128 are disposed to move directly under the respective trunnions 120 between the ends of the roll 118 and the bearing blocks 121. The blocks 125 move back and forth from right to left viewing FIGURE 1 as the shear operates. They move in a horizontal plane determined by the guide supports 127, the rods 124 having link connections 124a with the lower head 14 to compensate for the change in elevation of the lower head 14 during the shearing cycle.

Each block 125 has an upward projection 130 at its right hand end and a bumper 131 at its left hand end. The bumpers 131 limit the movement of the slides 128 toward the left. Connected with each slide 128 is a guide rod 132 which extends generally toward the right therefrom and passes through a guide bore 133 in the upward projection 130 of the corresponding block 125. Thus each slide 128 is guided for movement along the inclined surface 126. A compression coil spring 134 urges each slide 128 toward the left viewing FIGURE 1 and the compression coil springs 134 normally maintain the slides 128 against the bumpers 131.

When the blocks 125 move toward the left viewing FIGURE 1 the upper faces of the slides 128 engage the trunnions 120 and tend to raise the upper feed roll 118. However, the slides 128 are by the trunnions held against movement toward the left as the blocks 125 move toward the left, the springs 134 being progressively compressed. As the blocks 125 continue their movement toward the left the slides 128 ride down the inclined surfaces 126, compressing the springs 134 as just mentioned, until they are at a level low enough to enable them (the slides 128) to pass underneath the trunnions 120. They are then projected toward the left against the bumpers 131 by the springs 134. Thus on the movement of the blocks 125 toward the left the continuous operation of the feed rolls 117 and 118 is not interrupted.

On the movement of the blocks 125 toward the right viewing FIGURE 1 the slides 128 are against the bumpers 131 and cannot yield and the upper faces thereof engage and raise the trunnions 120 and hence the upper feed roll 118 against the action of the springs 123. Such raising of the upper feed roll occurs just as the cut is about to be made by the shear blades 15 and 16 and immediately after the leading end of the strip has been registered to the front stop and clamped by the clamping means as will presently be described. The raising of the upper feed roll 118 is only momentary and it is lowered to resume feeding of the strip immediately after the shearing operation. The upper feed roll returns to operative position under the action of the springs 123 as soon as the slides 128 have passed in their movement to the right. The purpose of the means for rendering the feed rolls inoperative for a small portion of the cycle is to allow the front stop and clamping means, and hence in effect the shears, to control the forward movement of the strip at the instant of shearing.

I find it desirable to regulate the speed of the feed rolls 117 and 118 so that the registering of the leading end of the strip to the front stop, which registering is brought about by the advance of the strip under the action of the feed rolls, is accompanied and aided by a slight buckle in the strip; in other words, the feed rolls may advance the strip just a little faster than the speed of advance of the front stop at the time when the leading end of the strip is registered to the front stop, causing a slight humping of the strip between the feed rolls and the front stop. This insures positive registry of the leading end of the strip to the front stop at the time when the strip is clamped. Then the feed rolls are rendered momentarily inoperative by the mechanism above described and the strip is drawn taut just an instant before the shearing operation takes place. This insures great accuracy in the length of the sheets being sheared from the strip.

Carried by and extending forwardly from the upper head 10 and constituting a portion of the upper shearing element is a supporting arm 17. The upper shearing element including the upper head 10, the upper shear blade 15, the supporting arm 17 and the mechanism carried thereby is designated as a whole by A. The lower shearing element including the lower head 14, the lower shear blade 16 and the mechanism carried by the lower head presently to be described is designated as a whole by B.

Figure 4:
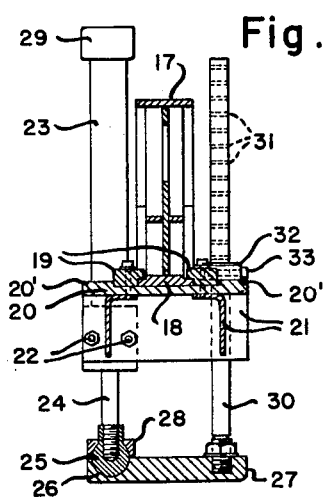
FIGURE 4 is a fragmentary vertical cross sectional view taken on the line IV—IV of FIGURE III.

The arm 17 has a bottom flange 18 shown in cross section in FIGURE 4 and which extends parallel to the pass line. Clamped to the flange 18 by clamping members 19 at opposite edges thereof is a plate 20 reinforced underneath by flanges 21. The plate 20 may be clamped to the flange 18 at any desired point along the flange. The plate 20 has raised portions 20' outside the respective clamping members 19 which assist in positioning the clamping members.

Figure 5:
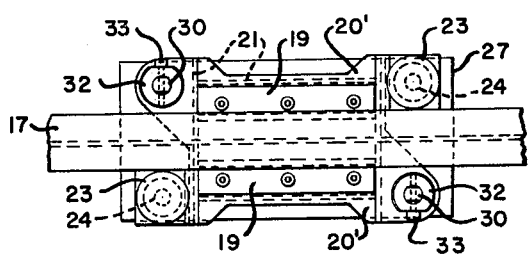

Fastened to the flanges 21 underlying the plate 20 by bolts 22 are two generally upright cylinders 23 disposed adjacent diagonally opposite corners of the plate 20 as shown in FIGURE 5. A piston operates in each of the two cylinders 23 and has a piston rod 24 connected therewith. Threaded to the bottom of each piston rod 24 is a member 25 of generally spherical shape adapted to be received in a conformably shaped socket 26 in the upper surface of a clamping member 27 and maintained in assembly therewith by a conformably shaped collar 28 which may be suitably fastened to the clamping member 27. Thus the clamping member 27 is carried by the two piston rods 24 through ball and socket joints at diagonally opposed corners of the clamping member. A cap 29 is applied to the upper end of each cylinder 23 and gas, commonly air, under pressure is imprisoned in the upper portion of each cylinder above the piston therein and tends to move the piston downwardly in the cylinder. Thus the clamping member 27 is under constant downward pressure of the gas above the pistons in the cylinders 23.

Threadedly connected with the clamping member 27 adjacent each of the two remaining corners thereof (the corners at which there are no connections with piston rod 24) is an upwardly extending rod 30 which passes freely through an opening in the plate 20 and has therethrough a series of desirably spaced bores 31. A stop collar 32 surrounds each rod 30 and is adapted to be fastened to the corresponding rod at a desired one of the bores 31 by a set screw 33. In use of the apparatus the collars 32 on the respective rods 30 will always be correspondingly positioned.

Connected with the lower head 14 by screws 34 is a bracket 35 to which is in turn connected by screws 36 an arm 37 which extends forwardly parallel to the pass line and parallel to the flange 18 of the arm 17. The bracket 35 and the arm 37 form portions of the lower shearing element B. Mounted upon the arm 37 is a front stop 38 adapted in use of the apparatus to be disposed in fixed position upon the lower shearing element B but which is adjustably positionable along the arm 37 by a screw adapted to be turned by a knob 39. The front stop is positioned in the center line of the shear immediately ahead (toward the right) of the clamping member 27 which is carried by the upper shearing element A as above described.

I find it desirable to provide additional supporting means for the arm 37 in the form of a link 40 pivoted at 41 to a bracket 42 connected with the arm and pivoted at 43 to a bracket 44 carried by the base or frame of the apparatus. The distance between the axes of the pivots 41 and 43 is the same as the distance between the axes of the pivots 11 and 13 so that a parallelogram is formed and the arm 37 will remain at all times in constant orientation parallel to the pass line but will partake of arcuate movement with the lower head 14.

In operation of my apparatus as the upper shearing element A and the lower shearing element B move toward the right viewing FIGURE 1 they approach each other. Simultaneously the leading end of the strip is advanced by the strip feeding means and registers against the front stop 38, i.e., against the left-hand vertical face of the front stop as viewed in FIGURE 1. As the upper and lower shearing elements A and B approach each other the clamping member 27 engages the upper face of the strip and clamps the strip to the arm 37 while the leading end of the strip is registered to the front stop 38. The clamping member 27 clamps the strip just before the instant of shearing and virtually simultaneously the feeding of the strip by the feed rolls 117 and 118 is interrupted as above described. After the strip is clamped the shearing elements A and B continue to move toward each other accompanied by compression of the gas in the upper portions of the cylinders 23 and movement of the stop collars up away from the plate 20 as indicated in chain lines in FIGURE 1. Immediately following the instant of shearing the feed rolls 117 and 118 resume feeding of the strip and the upper and lower shearing elements A and B continue to move toward the right and move away from each other. When the plate 20 engages the stop collars 32 the clamping member 27 moves along with the arm 17 and the sheared off portion of the strip is released.

The sheared sheets are received upon the upper surface of the endless conveyor 72 as the lower shearing element moves downwardly and toward the right viewing FIGURE 1. The endless conveyor 72 is driven so that its upper reach moves toward the right viewing FIGURE 1. It is desirably in two sections or separate parallel belts on opposite sides of the front stop 38. Desirably the conveyor 72 is driven at somewhat increased speed relatively to the speed of advance of the strip so that the sheared sheets will be delivered successively with spaces therebetween facilitating subsequent handling or stacking.

As the lower shearing element moves downwardly and to the right viewing FIGURE 1 with the leading end of the sheared sheet against the front stop 38 the front stop due to the characteristic movement of the lower shearing element moves from a position in which it projects above the conveyor to a position which it is retracted below the conveyor. In other words, the front stop is above the conveyor when the leading end of the strip is positioned thereagainst and when the front stop is performing its function of insuring that the strip is properly positioned relatively to the shear blades so that a portion of the strip or sheet of accurately predetermined length will be sheared off, and the front stop disappears downwardly between the opposed sections of the conveyor and to an elevation below the surface of the conveyor after the instant of shearing so that the sheared sheet is released by the front stop and taken over by the conveyor. In a sense the conveyor may be said to act as a stripper stripping the leading edge of each sheet from the front stop. By the time the lower shearing element moves back on its return stroke the front edge of the strip has passed on to the right viewing FIGURE 1 beyond the location of the front stop 38. No harm will be done to the sheared sheets should the front stop 38 tick the under surfaces thereof upon the return stroke of the lower shearing element.

While I have shown and described a present preferred embodiment of the invention it is to be distinctly understood that the invention is not limited thereto but may be otherwise variously embodied within the scope of the following claim.

I claim:

Apparatus for shearing strip advancing generally horizontally in a pass line comprising upper and lower shearing elements between which the strip advances, the upper and lower shearing elements respectively carrying coacting upper and lower shear blades, means for moving the shearing elements in the direction of advance of the strip at about the speed of advance of the strip at the instant of shearing, relatively generally toward each other immediately before the instant of shearing and relatively generally away from each other immediately after the instant of shearing, spaced supporting means positioned entirely beneath the strip supporting the strip disposed in the direction of advance of the strip from the shearing blades, said supporting means positioned entirely beneath the strip being the only means engaging either face of the strip immediately beyond the hereinafter mentioned front stop in the direction of advance of the strip, and a front stop mounted on the upper portion of the lower shearing element in fixed relation thereto and disposed beyond the lower shear blade in the direction of advance of the strip against which the leading end of the strip is positioned at the instant of shearing to insure shearing the strip into sheets of uniform predetermined length, the front stop due to the movement of the lower shearing element projecting up between the supporting means to a position above the pass line immediately before the instant of shearing to position the leading end of the strip and retracting below the pass line immediately after the instant of shearing, whereby the trailing end of a sheared sheet is merely raised slightly by the front stop and is not damaged or forced against any portion of the apparatus above the strip if the front stop projects up through the supporting means before the trailing end of the sheet has passed beyond the front stop.

References Cited in the file of this patent
UNITED STATES PATENTS

| | | |
|---|---|---|
| 584,658 | Aiken | June 15, 1897 |
| 3,004,456 | Moser | Oct. 17, 1961 |
| 3,037,412 | Sarka | June 5, 1962 |

UNITED STATES PATENT OFFICE
CERTIFICATE OF CORRECTION

Patent No. 3,134,283                    May 26, 1964

Albert J. Sarka

It is hereby certified that error appears in the above numbered patent requiring correction and that the said Letters Patent should read as corrected below.

Column 3, line 70, after "right" insert a comma; column 4, line 4, for "killed" read -- skilled --; column 6, line 12, for "rod", first occurrence, read -- rods --.

Signed and sealed this 27th day of October 1964.

(SEAL)
Attest:

ERNEST W. SWIDER  
Attesting Officer

EDWARD J. BRENNER  
Commissioner of Patents